Oct. 31, 1961  H. J. FERRIS ET AL  3,006,456
ENDLESS WHEELED LINK CHAIN CONVEYOR
Filed April 15, 1959  2 Sheets-Sheet 1

Inventors:
Howard J. Ferris
Robert G. Ferris
Robert L. Yuenger
By: Hofgren, Brady, Wegner,
Allen & Stellman
Attorneys Oct. 31, 1961 H. J. FERRIS ET AL 3,006,456
ENDLESS WHEELED LINK CHAIN CONVEYOR
Filed April 15, 1959 2 Sheets-Sheet 2
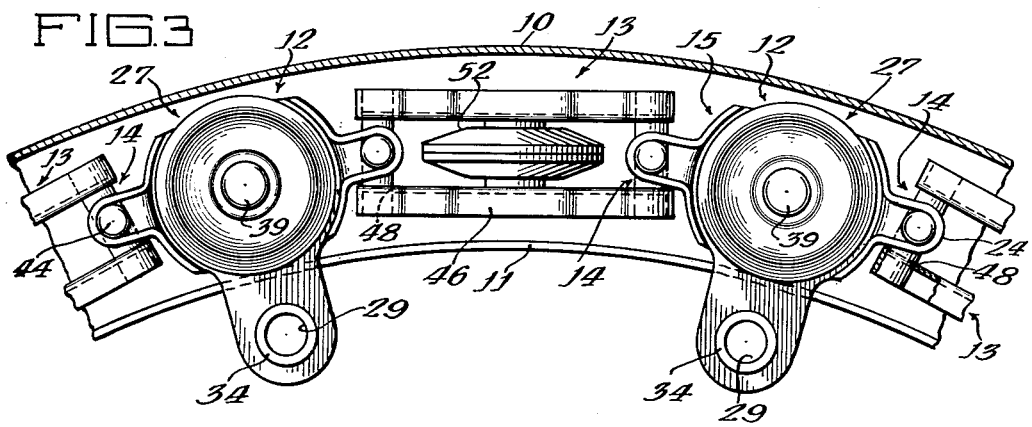
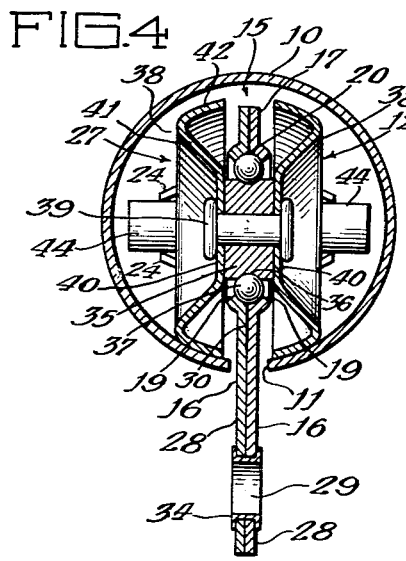
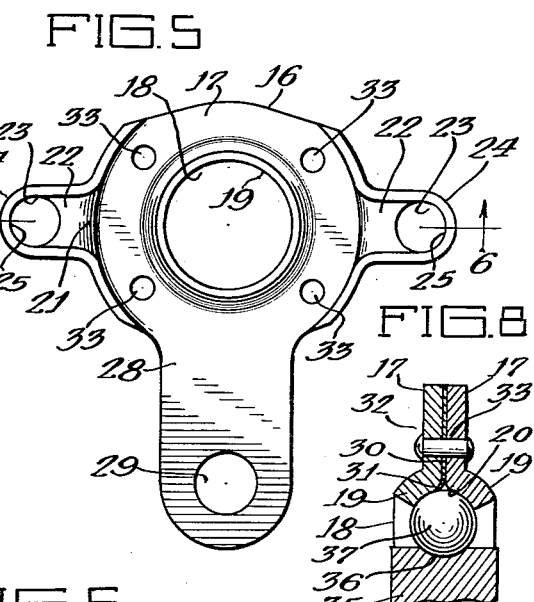
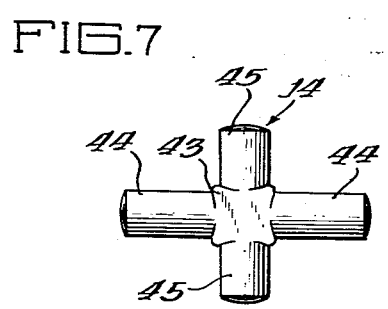
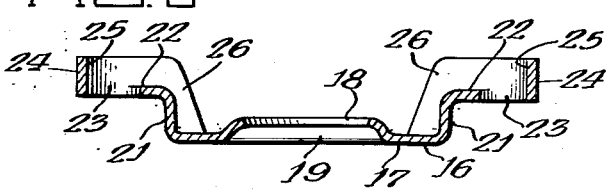
Inventors:
Howard J. Ferris
Robert G. Ferris
Robert L. Yuenger
By: Hofgren, Brady, Wegner,
Allen & Stellman
Attorneys

United States Patent Office 3,006,456
Patented Oct. 31, 1961

3,006,456
ENDLESS WHEELED LINK CHAIN
CONVEYOR
Howard J. Ferris, Gulfport, Fla., and Robert G. Ferris and Robert L. Yuenger, Harvard, Ill., assignors to Starline, Inc.
Filed Apr. 15, 1959, Ser. No. 806,491
12 Claims. (Cl. 198—177)

This invention relates to an endless wheeled link chain conveyor of the type which has alternate load bearing links and connecting guide links running in a closed, split track.

The principal object of the invention is to provide an improved chain conveyor of the above type.

Another object of the invention is to provide a conveyor chain construction in which the load bearing links have a frame fabricated from a pair of identical stampings which are formed to provide an outer ball race, and a wheel assembly has a hub forming the inner ball race with wheel members secured to the hub flanking the frame so as to ride in the track on opposite sides of the split.

Yet another object of the invention is to provide a load bearing link which has a flexible annular shim sandwiched between the stamped metal frame plates with its inner marginal portion contacting the balls in the raceway to carry lubricant to the ball bearings.

A further object of the invention is to provide a load bearing link having spaced ears at its ends to receive transverse arms of a cruciform pin which also has upright arms between said ears to pivotally receive the end portions of two adjacent connecting guide links.

Yet another object of the invention is to provide a conveyor chain construction in which a transverse guide wheel is mounted between two horizontal guide plates which have aligned bearing openings in their ends to receive the upright arms of the cruciform pins, and in which a fastening member extends through the side plates and the horizontal wheel to rotatably support the wheel and also to fasten the side plates together in connection with said upright arms.

The invention is illustrated in a preferred embodiment in the accompanying drawings in which:

FIG. 3 is a view similar to FIG. 1 of a curved track section to show the articulation of the load bearing links with respect to the connecting guide links;

FIG. 4 is a transverse section on an enlarged scale taken substantially as illustrated along the line 4—4 of FIG. 1;

FIG. 5 is a side elevational view of a single frame plate for a load bearing link;

FIG. 6 is a section taken substantially as illustrated along the line 6—6 of FIG. 5;

FIG. 7 is an elevational view of a cruciform pin used to connect the load bearing and connecting guide links; and FIG. 8 is a fragmentary sectional view of a portion of a load bearing link on a greatly enlarged scale to show the arrangement of the lubricating shim.

Figure 2:
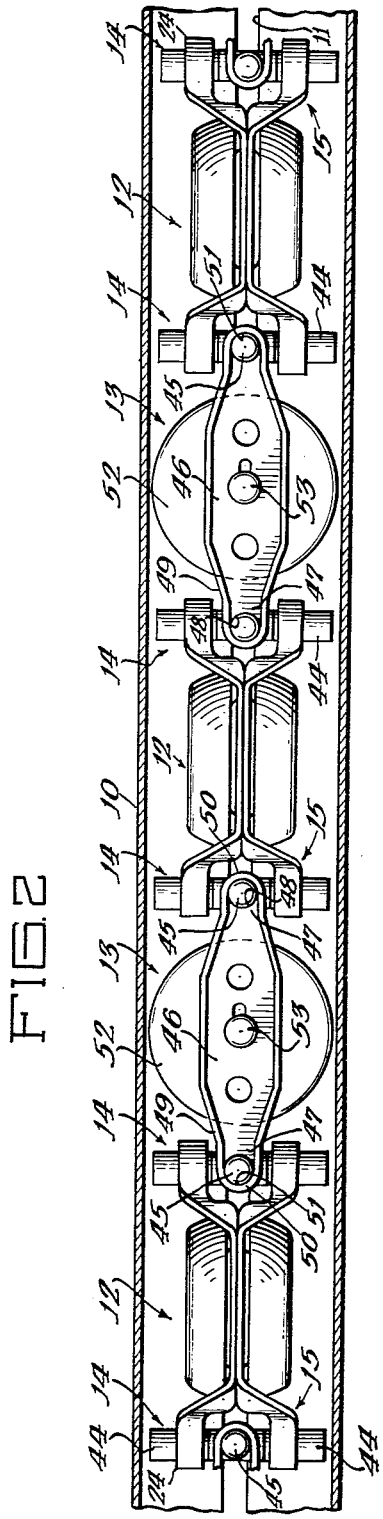
FIG. 2 is a plan view of the chain, the track being shown in central transverse section.

Referring to the drawings in greater detail, the conveyor of the present invention includes a track 10 in the form of an endless cylindrical tube which has a split 11 extending continuously along one side in the plane of the axis of the track. Mounted for travel in the track is an endless wheeled link chain conveyor which has alternate load bearing links, indicated generally at 12 and connecting guide links indicated generally at 13. The links are connected to one another for articulation in two perpendicular planes by cruciform pins indicated generally at 14.

Each load bearing link 12 has an upright frame, indicated generally at 15, consisting of a pair of metal frame stampings 16 having closely adjacent planar central hub portions 17 with registering round openings 18 the margins of which are flared at 19 to form an outer ball race 20. Each frame stamping 16 is bent outwardly as seen at 21, so that the two plates have diverging end portions 22 which are of reduced size to afford spaced pivot ears having aligned pivot holes 23. A laterally extending arcuate flange 24 partially surrounds each pivot hole 23 to provide a broad bearing surface 25 at the extremity of each ear, and said flanges extend along the margins of the ears and merge into integral skirts 26 which are substantially concentric with and closely adjacent the periphery of a wheel assembly, indicated generally at 27. Each frame plate includes a pendant load bearing portion 28, and said portions have aligned holes 29.

Sandwiched between frame plates 16 is a flexible annular shim 30 the inner marginal portion 31 of which extends into raceway 20. The shim must be so thin and flexible that, as seen in FIG. 8, its inner marginal portion 31 bends where it bears against ball bearings in the wheel assembly 27. Brass or plastic about .003" thick is suitable. Lubricant is carried on the shims to the balls, instead of being trapped in the pocket at the juncture of the flared margins 19 of the plates, where it cannot contact the balls. Frame plates 16 and shim 30 are firmly secured together by rivets 32 impaling holes 33 in the plates and registering holes in the shim, and also by a grommet 34 which is set in the aligned load bearing holes 29.

As best seen in FIGS. 4 and 8, the wheel assemblies 27 include a hub 35 which is circumferentially grooved to form an inner raceway 36, so that ball bearings 37 may be positioned in the raceway formed by outer race 20 and inner race 36; and a pair of wheel members 38 are firmly secured to opposite faces of hub 35 by a rivet 39. As seen in FIG. 4, each of said wheel members has a central fastening portion 40, and flares outwardly from the fastening portion to provide a web 41 the outer marginal portion of which is turned inwardly in an arc 42 forming a running surface for the wheel which is complementary to the inner surface of tubular track 10. Thus, wheel assembly 27 has its two wheel members 38 flanking the upright frame 15 and supported on the lower portion of the track adjacent the two sides of split 11. The pendant portions 28 of the frame plates extend downwardly through the split so that the grommets 34 may receive load bearing hooks.

Figure 1:
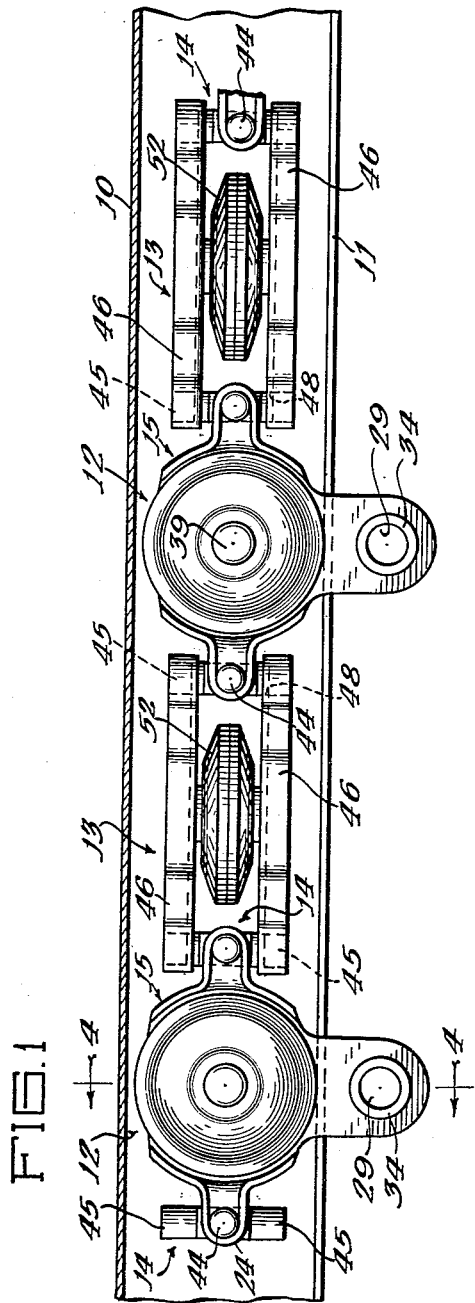
FIG. 1 is a side elevational view of a conveyor chain constructed in accordance with the invention, the track in which the chain runs being shown in central vertical section.

Referring now to FIG. 7, cruciform pin 14 has a somewhat cubical center 43, transverse arms 44 and upright arms 45 which are shorter than the transverse arms. As seen in FIGS. 1 to 3, the cruciform pins are mounted with their transverse arms 44 extending through the bearing holes 23 of bearing ears 22, so that they may rock in contact with the bearing surfaces 25 afforded by arcuate flanges 24; while the upright arms 45 of said pins are positioned between said spaced bearing ears 22. As seen in FIGS. 2 and 4, transverse arms 44 of pins 14 extend outwardly a substantial distance beyond flanges 24 of bearing ears 22 so that they may be engaged by suitable driving mechanism which may be either a driving sprocket of suitable shape around which the chain travels, or an endless chain drive with drive dogs which engage the end portions of said pins. Both types of drives are well-known for this type of conveyor, and accordingly no drive mechanism is described herein.

Connecting guide links 13 are seen in FIGS. 1 and 2 to consist of a pair of side plates 46 having reduced end portions 47 which extend between pivot ears 22 of the load bearing links and have bearing apertures 48 to receive upright arms 45 of cruciform pins 14. Side plates 46 have peripheral perpendicular flanges 49 the end portions 50 of which are arcuate in form and partially surround the bearing apertures 48 to provide broad bearing surfaces 51 for the upright arms of the cruciform pins. Positioned between the side plates 46 is a guide wheel 52, and a fastening member 53 extends through holes in the side plates and through the hub of the guide wheel so as to rotatably support the wheel and also fasten the side plates and the wheel together with said plates pivotally engaged with upright arms 45 of the cruciform pins 14.

All the steel parts in the conveyor chain assembly are heat treated to provide substantially non-wearing surfaces.

From the foregoing description it is clear that the load bearing links 12 and connecting guide links 13 may articulate both about the transverse arms 44 and the upright arms 45 of cruciform pins 14. Thus, the chain may negotiate curves of reasonable arc, either in the plane of the split 11 or in a plane perpendicular to that of the split 11. The integral skirts 26 on the frame plates 16 of the load bearing links strengthen bearing flanges 24, and also prevent the flanges 49 on connecting link plates 46 from contacting wheel members 38 as the chain negotiates a curve, so as to prevent frictional drag on the chain. No similar protection is needed for the guide wheels 52, which contact the tube only on horizontal curves.

If it is ever necessary to replace a load bearing link 12, this may be easily accomplished by removing the fastenings 53 from the connecting links 13 which flank the particular load bearing link whereupon the load bearing link with the cruciform pins carried in its pivot ears may be removed and replaced by a new link. Similarly, any connecting link 13 may be disassembled by removing its fastener 53, so that the entire link may be replaced by a new link.

The foregoing detailed description is given for clearness of understanding only and no unnecessary limitations are to be understood therefrom, as some modifications will be obvious to those skilled in the art.

We claim:

1. In an endless wheeled link chain conveyor having alternate load bearing links and connecting links in a split hollow track, a load bearing link comprising: an upright frame including a pair of metal frame stampings having closely adjacent central hub portions with registering round openings the margins of which are flared to form an outer ball race, and said stampings having diverging end portions of reduced size affording spaced pivot ears at each end of the link with aligned pivot holes in said ears, there being a laterally extending arcuate flange partially surrounding each hole to provide a broad bearing surface at the extremity of each ear; means securing said stampings together; and a wheel assembly journalled in said ball race, said assembly including a hub forming an inner ball race, ball bearings in the raceway formed by said inner and outer races, and a pair of wheel members secured to said hub flanking the hub portions of the stampings.

2. The device of claim 1 in which the stampings have abutting pendant portions extending through the split in the track, there being holes in said pendant portions to receive load bearing hooks.

3. The device of claim 2 in which the means securing the stampings together includes a grommet in the holes in the pendant portions.

4. The device of claim 1 in which a flexible annular shim is sandwiched between the hub portions of the frame stampings and has its inner marginal portion in contact with the ball bearings.

5. The device of claim 1 in which the arcuate flanges which partially surround the pivot holes extend along the margins of the ears and merge into skirts which are substantially concentric with and closely adjacent the wheel assembly.

6. In an endless wheeled link chain conveyor having alternate load bearing links and connecting links, a load bearing link comprising: an upright frame including a pair of frame plates having closely adjacent central hub portions with registering round openings the margins of which are flared to form an outer ball race, and said plates having end portions of reduced size affording pivot ears in which there are aligned pivot holes; a flexible annular shim sandwiched between the hub portions with its inner marginal portion extending into said ball race; means securing said plates and shim together; and a wheel assembly journalled in said ball race, said assembly including a hub forming an inner ball race, ball bearings in the raceway formed by said outer and inner races, said bearings being in contact with the inner marginal portion of the shim, and a pair of wheel members secured to said hub flanking the hub portions of the frame plates.

7. An endless wheeled link chain conveyor having alternate load bearing links and guide links in a split tubular track, comprising: a load bearing link having an upright frame which is narrow in its central portion and flares to provide a pair of laterally spaced pivot ears at each of its ends, there being aligned holes in each pair of ears and upright wheel means journalled in and flanking the central portion of the frame to roll in the tube flanking the split; cruciform pin means having transverse arms extending through the aligned holes in each pair of ears and a substantial distance laterally on each side of said ears so as to extend outside the side planes of said load bearing link, said pin means also having upright arms between and extending above and below the ears; and a guide link having parallel, horizontal side plates with aligned openings at their ends pivotally engaging said upright arms above and below the pivot ears of the load bearing link, a guide wheel between said side plates, and a fastening member extending through the side plates and the hub of the wheel to rotatably support the wheel and fasten the side plates together in engagement with said upright arms.

8. An endless wheeled link chain conveyor having alternate load bearing links and guide links in a split tubular track, comprising: a load bearing link having an upright frame consisting of two metal stampings which have substantially abutting central hub portions, diverging end portions of reduced size providing laterally spaced pivot ears which have aligned holes therein, and a laterally extending arcuate flange partially surrounding each hole to provide a broad bearing surface, and upright wheel means journalled in the central hub portion of the frame to roll in the tube flanking the split; cruciform pin means having transverse arms extending through the aligned holes in each pair of ears, said pin means also having upright arms between and extending above and below the ears; and a guide link having parallel, horizontal side plates with aligned openings at their ends impaled upon said upright arms above and below the pivot ears of the load bearing link, fastening means securing the side plates in spaced relationship and in engagement with said upright arms, and a guide wheel journalled between the side plates.

9. In an endless wheeled link chain conveyor having alternate load bearing links and connecting links in a split hollow track, a load bearing link comprising: an upright frame including a pair of metal frame stampings having closely adjacent central hub portions with registering round openings the margins of which are flared, and said stampings having diverging end portions of reduced size affording spaced pivot ears at each end of the link with aligned pivot holes in said ears, there being a laterally extending arcuate flange partially surrounding each hole to provide a broad bearing surface at the extremity of each ear; means securing said stampings together; a composite, effectively integral wheel assembly having a central hub portion concentrically positioned in the round openings of said stampings, the space between said hub portion and said flared margins of the frame stampings providing an anti-friction bearing raceway, said wheel assembly including a pair of wheel members which are closest to one another in the hub portion and which flare concentrically outwardly to provide spaced wheel surfaces supporting the link adjacent the split in the track; and anti-friction bearing means in the bearing raceway.

10. In an endless wheeled link chain conveyor having pin-connected alternate load bearing links and connecting links in a split hollow track, a load bearing link comprising: an upright frame including a pair of metal stampings having substantially abutting central hub portions with registering round openings, diverging end portions of reduced size providing spaced ears having laterally aligned holes, and a laterally extending arcuate flange partially surrounding each hole to provide broad bearing means for a connecting pin; means securing said stampings together; anti-friction bearing means within the periphery of said registering round openings; and a composite, effective integral wheel assembly having a central hub portion journalled in said bearing means, said wheel assembly including a pair of wheel members which are closest to one another in the hub portion and which flare concentrically outwardly to provide spaced wheel surfaces flanking the upright frame.

11. In an endless wheeled link chain conveyor having alternate load bearing links and connecting links, a load bearing link comprising: an upright frame including a pair of frame plates having closely adjacent central hub portions with registering round openings the margins of which are flared to form an outer ball race, and said plates having end portions of reduced size affording pivot ears in which there are aligned pivot holes; a flexible annular shim sandwiched between the hub portions with its inner marginal portion extending into said ball race; means securing said plates and shim together; and a composite, effectively integral wheel assembly having a central hub portion concentrically positioned in the round openings of the frame plates, said assembly including a pair of wheel members which are closest to one another in their central areas and which flare concentrically outwardly to provide spaced wheel surfaces flanking the upright frame, there being an external annular groove in the wheel hub portion forming an inner ball race facing the outer ball race, and ball bearings in the raceway formed by said outer and inner races, said bearings being in contact with the inner marginal portion of the shim.

12. An endless wheeled link chain conveyor having alternate load bearing links and guide links in a split tubular track, comprising: a load bearing link having an upright frame which is narrow in its central portion and flares to provide a pair of laterally spaced pivot ears at each of its ends, there being aligned holes in each pair of ears and upright wheel means journaled in and flanking the central portion of the frame to roll in the tube flanking the split; cruciform pin means having transverse arms extending through the aligned holes in each pair of ears, said pin means also having upright arms between and extending above and below the ears; and a guide link having parallel, horizontal side plates with aligned openings at their ends pivotally engaging said upright arms above and below the pivot ears of the load bearing link, a guide wheel between said side plates, and a fastening member extending through the side plates and the hub of the wheel to rotatably support the wheel and fasten the side plates together in engagement with said upright arms.

References Cited in the file of this patent

UNITED STATES PATENTS

| | | |
|---|---|---|
| 1,672,799 | Benner | June 5, 1928 |
| 2,372,199 | Hassler | Mar. 27, 1945 |

FOREIGN PATENTS

| | | |
|---|---|---|
| 772,401 | Great Britain | Apr. 10, 1957 |